May 26, 1959     R. B. TILNEY     2,888,039
REVERSE CYCLE VALVE
Filed March 14, 1955

INVENTOR:
RALPH B. TILNEY,
BY Kingsland, Rogers & Ezell
ATTORNEYS

United States Patent Office 2,888,039
Patented May 26, 1959

2,888,039

REVERSE CYCLE VALVE

Ralph B. Tilney, Clayton, Mo., assignor to Alco Valve Company, University City, Mo., a corporation of Missouri Application March 14, 1955, Serial No. 494,175

4 Claims. (Cl. 137—601)

The present invention relates to valves, and more particularly to a novel pilot-operated four-way valve for reverse cycle operations in closed fluid flow systems.

Briefly, the invention contemplates a novel four-way valve having a main inlet port, a main outlet port, and a pair of combination inlet-outlet ports, the arrangement being such that the main inlet may be communicated directly with one, and the main outlet with the other, of the combination ports and then operated so as to communicate the main outlet with the one, and the main inlet with the other, of the combination ports. Inasmuch as the valve is primarily intended for applications where a substantial pressure differential exists between the main inlet and the main outlet, this pressure difference is utilized, not only to maintain the valve in a selected condition of flow control, but also in effecting changes from one condition to the other.

Changes of flow in the four-way valve are brought about by means of a multiple piston arrangement and a three-way pilot valve arrangement which selectively communicates the piston cylinders either with the relatively high pressure maintained at the main inlet port or with the relatively low pressure maintained at the main outlet port.

It is apparent from the foregoing that the primary object of the present invention is to provide a novel four-way valve which is adapted to direct a pressure flow in a selected one of two directions and to receive a return flow from the other.

It is another object of the invention to provide a four-way valve which utilizes pressure differences existing therewithin for selectively maintaining a pressure seal between different fluid passage portions of the valve.

It is another object of the invention to provide a four-way valve which makes use of pressure differences existing therewithin for reversing a fluid flow condition.

It is another object of the invention to provide a piston-operated four-way valve having a pilot valve for selectively communicating a piston chamber with either a high or a low pressure existing within the four-way valve whereby to operate the latter.

Figure 1:
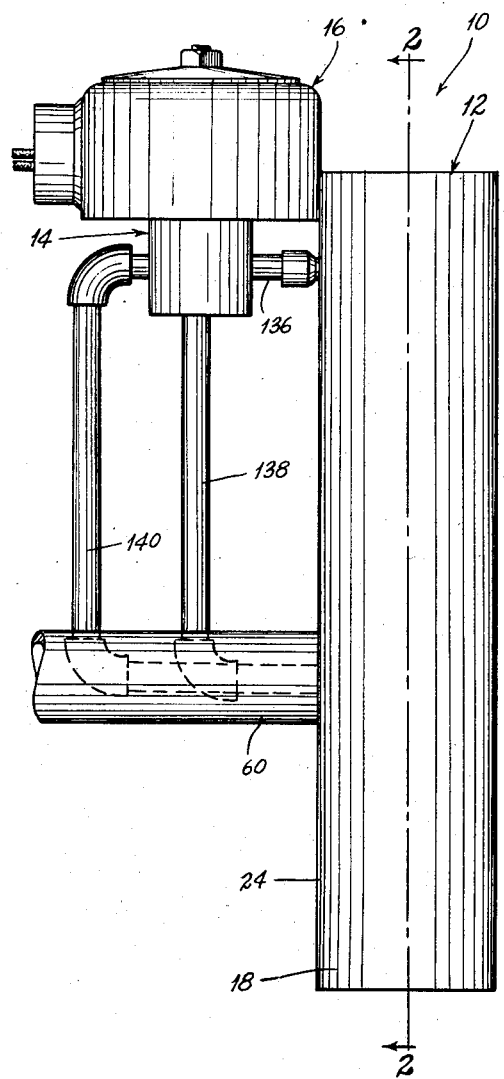
Figure 2:
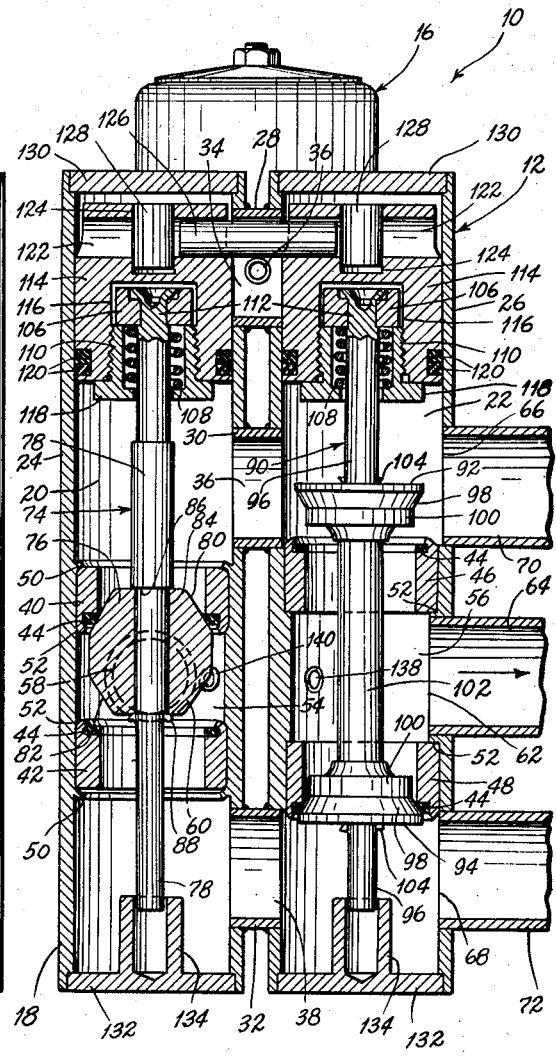

The foregoing objects and advantages will be apparent from the following description taken in conjunction with the accompanying drawing, in which:

Figure 1 is a side elevational view of a reverse cycle valve conforming to the teachings of the present invention; and Figure 2 is a sectional view taken generally along the line 2—2 of Figure 1.

Referring more particularly to the figures by means of the reference numerals applied thereto, the numeral 10 designates generally a reverse cycle valve constructed in accordance with the teachings of the present invention. The valve 10 includes as major components thereof a four-way valve assembly 12, a three-way pilot valve 14, and a solenoid assembly 16.

Considering first the four-way valve assembly 12, it will be noted from Figure 2 of the drawing that a main body 18 is formed so as to provide parallel barrels 20 and 22. The double-barreled body 18 may be of cast or forged construction or it may, as illustrated in Figure 2, comprise a pair of independent tubular members 24 and 26 interconnected and intercommunicated by short tubular sleeves 28, 30 and 32. In either case, it will be understood that intercommunicating cross passages 34, 36 and 38 are provided between the generally cylindrical barrels 20 and 22.

The portions of each of the barrels 20 and 22 between the cross passages 36 and 38 are fitted with a pair of oppositely facing valve seats. Thus, considering the barrel 20, sleeve elements 40 and 42, each provided with a resilient annular seat 44, are pressed into position with the seats 44 disposed toward each other. The barrel 22, on the other hand, has sleeve elements 46 and 48, each of which is also provided with a resilient seat 44, the sleeve elements 46 and 48 being pressed into place so that the seats 44 face away from each other. Figure 2 illustrates a preferred arrangement of these valve seats, and it will be noted that the several seats 44 are disposed in appropriate grooves in their respective sleeve elements and are retained by an inturned edge thereof. In addition to their being pressed into place, it is preferred that the sleeve elements 40 and 42 be further secured by staking, as indicated at the points 50. It is also desirable that all of the sleeve elements 40, 42, 46 and 48 be firmly positioned against preformed shoulders as indicated at the points 52.

It will be noted that the arrangement here described is such as to define a chamber 54 between the sleeves 40 and 42, and a chamber 56 between the sleeves 46 and 48. The chambers 54 and 56 may be further designated as the main inlet chamber and the main outlet chamber, respectively, of the valve assembly 12. A main inlet port 58 communicates the inlet chamber 54 with an external conduit 60, and a main outlet port 62 communicates the outlet chamber 56 with an external conduit 64.

In addition to the external ports 58 and 62, the assembly 12 is provided with combination inlet-outlet ports 66 and 68 communicating with external conduits 70 and 72, respectively. As illustrated in Figure 2, both of the combination ports 66 and 68 are provided in the barrel 22, being disposed respectively above and below the sleeve elements 46 and 48 therein. Clearly, however, the ports 66 and 68 could as well be formed in the barrel 20 on opposite sides of the sleeve elements 40 and 42, or one port could be formed in each of the barrels 20 and 22.

A valve assembly 74 comprising a head 76 mounted on a stem 78 is disposed for reciprocation in the barrel 20. The head 76 has opposed tapered plug-like ends 80 and 82 adapted to engage the annular elements 44 in the valve sleeves 40 and 42, respectively. It will be noted that the head 76 is so dimensioned as to be engageable with only one of these elements 44 at a time. Preferably, the head 76 is pressed onto a portion 84 of the valve stem 78, being positioned against a shoulder 86 and staked in place as illustrated at 88.

A valve assembly 90 comprising a pair of mushroom type heads 92 and 94 mounted in spaced relation on a valve stem 96 is disposed for reciprocation in the barrel 22. The heads 92 and 94 take the shapes generally shown in Figure 2 of the drawings and may be identical, except for being mounted in opposed relation. It will be noted that each of the valve heads 92 and 94, in addition to having a tapered portion 98 adapted to seat against a valve seat 44, has a cylindrical extension 100 provided for a purpose to appear hereinafter. The valve stem 96 has a portion 102 of maximum diameter against opposite ends of which the heads 92 and 94 are disposed and staked in place as indicated at the points 104. It will be noted that the portion 102 has a length which enables but one of the heads 92 or 94 to be seated at a time.

Preferably, the length of the head 76 of the valve assembly 74 and the spacing of the heads 92 and 94 of the valve assembly 90 are so related as to require approximately equal linear travel of these assemblies in unseating them in one direction and seating them in the other. It will be understood, however, that there is no requirement for these distances to be identical.

At their respective upper ends, the valve stems 78 and 96 are each provided with a head 106 serving to retain a compression spring 108 and a spring cage 110. The illustrated heads 106 are shown mounted on a reduced diameter end portion 112 having its extreme end drilled out and peened over.

A separate piston 114 is fastened to the upper end of the respective valve assemblies 74 and 90, the connection being by threaded engagement of the spring cages 110 in blind holes 116 formed in the pistons 114. It will be noted that the depth of the holes 116 is such that, when the spring cages 110 are inserted to the maximum depth permitted by flanges 118 thereon, there is still room for longitudinal movement of the head 106 between the inserted ends of the cages 110 and the blind ends of the holes 116. In addition, it will be understood that the free length of each of the compression springs 108 is such that these springs are under continuous compression as long as the cages 110 are inserted in the pistons 114 as described.

Each of the pistons 114 has a maximum outside diameter which enables it to fit slidably within the upper end portion of the respective barrels 20 and 22, and each may also be provided with conventional rings 120 for providing a smooth sliding peripheral seal.

The pistons 114 have their upwardly disposed ends somewhat reduced in diameter and each is provided with a cross bore 122 and an intersecting longitudinal bore 124. A single pin 126 is loosely disposed in the cross bores 122 of both the pistons 114 and, as illustrated, is retained thus by pins 128 pressed into the longitudinal bores 124.

The upper ends of the barrels 20 and 22 are closed by suitable cap elements 130 secured in any conventional manner. The bottom ends of the barrels 20 and 22 are similarly closed by means of caps 132 preferably provided with tubular guides 134 for the lower ends of the valve stems 78 and 96.

Directing attention now to the three-way outlet valve 14, it will be noted from Figure 1 that the valve 14 has all of its three ports connected into the four-way valve assembly 12. A conduit 136 connects into the sleeve 28 of the valve assembly 12 so as to communicate the valve 14 with the cross passage 34 and, hence, with the extreme upper ends of the barrels 20 and 22 above the pistons 114 therein. Similarly, a conduit 138 connects into the outlet chamber 56, and a conduit 140 connects into the inlet chamber 54. It will be understood that the three-way valve 14 is, itself, of a conventional type wherein the conduit 136 may be selectively communicated with either of the conduits 138 and 140.

In the illustrated embodiment of the valve 10, the pilot valve 14 is provided with an actuating device in the form of a solenoid assembly 16. It will be understood that the solenoid device 16 is operatively connected to the valve 14 and functions so as to effect the aforementioned changes in communication between the conduit 136 and the conduits 138 and 140.

*Operation*

The pilot-operated four-way valve 10 is particularly adapted for use in reversible fluid flow systems such as those employing heat pump or refrigerating cycles. For example, a typical application may be assumed wherein the conduits 60 and 64 are connected into the pressure and suction sides, respectively, of a compressor handling refrigerant in a closed system. The conduits 70 and 72 would then be connected into opposite sides of the remainder of the fluid flow system which would include the heat exchangers, expansion valve, etc.

If now it be assumed that the three-way pilot valve 14 is in a position which communicates the outlet chamber 56 with the cross passage 34, it is apparent that the relatively low suction pressure which obviously exists in the outlet chamber 56 will also be established at the upper ends of the barrels 20 and 22 above the piston 114 therein. Under this condition, and leaving for the moment the question as to how they got there, if it be now assumed that the valve assemblies 74 and 90 are in the positions illustrated, it is evident that pressure flow entering the assembly 12 through the main inlet port 58 will pass downwardly through the valve sleeve 42, through the cross passage 38, and outwardly through the combination port 68. The fluid will return inwardly through the combination port 66 and will flow downwardly through the valve sleeve 46 and outwardly through the main outlet port 62.

Under the conditions described above and illustrated in the drawings, inlet pressure exists in the inlet chamber 54 and acts upwardly on the valve 76. A somewhat lower pressure reduced by the drop across the valve seat exists in the lower ends of the two cylinders. A lower pressure exists in the upper cylinders above the valves. Exhaust pressure exists in the outlet, it being below the intermediate pressure above the valve seat 54 by the amount of the drop across that seat, and also being approximately suction pressure of the system. Therefore, high pressure is maintained below the seated valve heads 76 and 94, whereas reduced pressure is maintained above these elements. Thus, as far as the seated valves themselves are concerned, the pressure differential acts in a direction to maintain a desired condition. Further, inasmuch as intermediate downstream pressure exists below the pistons 114, whereas low outlet or exhaust pressure exists above them, the net force on the pistons 114 is upward, and they are maintained as illustrated.

If now it be assumed that the three-way valve 14 be actuated by means of the solenoid 16 in a manner to cut off the previous communication of the outlet chamber 56 with the cross passage 34 and to establish communication between this cross passage and the inlet chamber 54, high inlet pressure will be brought to bear upon the upper ends of both the pistons 114, and although downward movement of these pistons will be resisted by the aforementioned low intermediate pressure tending to maintain the valve heads 76 and 94 seated as illustrated, the higher pressure above the pistons 114 will cause them to be moved downwardly and the heads 76 and 94 to be unseated downwardly. As soon as the heads 76 are thus unseated, all pressures within the assembly 12 tend to become equalized. However, there is always some pressure drop across the valves 92 and 94, owing to the skirts 100, and there is always some drop across the valves 80 and 82, at least up to their middle position, owing to their tapering interfit with their valve seats. Consequently, there will remain a substantial net downward thrust against the pistons 114. Furthermore, the sudden unseating of the valve heads 76 and 94 will tend to move the valve assemblies 74 and 90 to the opposite ends of their travel by inertia. Finally, it is apparent that, with the approach of any of the tapered valve portions 80, 82 and 98 toward its respective seat 44, the pressure drop increases to completely close an almost closed valve, a condition made more effective by the fact that, while the high pressure (upstream) valve 80 or 82 is closing to throttle flow and increase pressure drop, the associated low pressure (downstream) valve 92 or 94 is opening wider to more readily lower the pressure downstream of the closing high pressure valve.

Upon complete closure of the valve assembly 74 and 90 in a direction opposite to that illustrated, the pressure differences are again established within the barrels 20 and 22 tending to maintain the new closed condition. This includes high pressures above both valve sets and low pressures below both, and equal high pressures on opposite sides of the pistons 114.

When, once again, it is desired to revert the valve 10 to the illustrated condition, the pilot valve 14 is actuated by means of the solenoid 16 so as once more to connect the outlet chamber 56 with the piston chambers above the piston 114. With this reduced pressure above the piston 114 and with the high pressure from the compressor directly connected to the space below the piston 114, the valve assemblies 74 and 90 will be quickly unseated so as to move upwardly under similar, but oppositely directed, forces to those previously described. In such action, the high pressure below the pistons 114 drives them upwardly at least to midposition of the valves, after which the pressure differences on opposite sides of the valves, with any pressure differences on opposite sides of the pistons, drives the valves to the upper positions.

It will be understood that the cross pin 126 acts as a yoke maintaining the two pistons 114 at substantially the same level at all times, but provides enough lost motion to permit free sliding of both pistons. Also, the flexible connections between the valve stems 78 and 96 and their respective pistons 114 allow for compensating differences in movement required to seat the assemblies 74 and 90. Hence, the requirement for extremely accurate dimensioning of the valve heads 76, 92 and 94 is eliminated.

Clearly, there has been described a reverse cycle valve which fulfills the objects and advantages sought therefor.

It is understood that the foregoing description has been given only by way of illustration and example, and that changes and rearrangement of parts, the substitution of equivalent elements, and the like, which will be obvious to those skilled in the art, are considered to be within the scope of the invention which is limited only by the claims which follow.

What is claimed is:

1. In a pilot-operated four-way valve, in combination, a housing comprising parallel barrels, means in each barrel defining a fluid chamber intermediate its length, said chambers being individually ported externally of the housing, said barrels being directly intercommunicated beyond each end of the respective chambers therein, the intercommunicated portions of the barrel beyond respective ends of the chambers being individually ported externally of the housing, an individual valve seat formed at each end of each chamber, dual valve means reciprocably disposed in each barrel for alternate cooperation with the valve seats therein in closing one end of each chamber and opening the other, individual piston means connected to each of said dual valve means and slidably disposed in the respective barrels adjacent one end thereof so as to have one side in continuous communication with the immediately adjacent directly intercommunicated and externally ported portions of the barrels, and valve means for selectively communicating the other side of said piston means with either of said externally ported fluid chambers.

2. The combination of claim 1 plus means interconnecting the pistons to assure their simultaneous movement in respective directions to avoid direct intercommunication of both chambers with the directly intercommunicated ends in either direction therebeyond.

3. The combination of claim 2 wherein the ends of the barrels beyond the piston means are intercommunicated so as to provide equal pressure differentials across both pistons.

4. The combination of claim 1 wherein each of said dual valve means includes rod-like means extending from their respectively associated piston means adjacent one end of the barrels to the ends of the barrels remote from said piston means, each of the rod-like means being provided with longitudinally spaced valve surfaces for reciprocably engaging the valve seats associated therewith, and means at said remote ends of each barrel for guiding the ends of the rod-like means so as to maintain the reciprocable valve surfaces coaxial with the barrels.

References Cited in the file of this patent
UNITED STATES PATENTS

| | | |
|---|---|---|
| 322,388 | Lord | July 14, 1885 |
| 2,615,469 | Schofield | Oct. 28, 1952 |
| 2,638,123 | Vargo | May 12, 1953 |
| 2,654,227 | Muffly | Oct. 6, 1953 |
| 2,708,561 | Ehlke | May 17, 1955 |
| 2,747,376 | Muffly | May 29, 1956 |
| 2,758,447 | Prosek | Aug. 14, 1956 |